United States Patent
Tanaka

(10) Patent No.: US 10,460,268 B2
(45) Date of Patent: Oct. 29, 2019

(54) SYSTEM AND METHOD FOR GENERATING DEVICE WORK ORDERS BASED ON WORK PATTERNS AND PLANT LOCATION

(71) Applicant: TLV Co., Ltd., Kakogawa-shi (JP)

(72) Inventor: Yoshiaki Tanaka, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 231 days.

(21) Appl. No.: 15/529,569

(22) PCT Filed: Oct. 16, 2015

(86) PCT No.: PCT/JP2015/079306
§ 371 (c)(1),
(2) Date: May 25, 2017

(87) PCT Pub. No.: WO2016/084514
PCT Pub. Date: Jun. 2, 2016

(65) Prior Publication Data
US 2017/0323238 A1    Nov. 9, 2017

(30) Foreign Application Priority Data
Nov. 26, 2014  (JP) ................. 2014-238939

(51) Int. Cl.
*G06Q 10/06* (2012.01)
*G06Q 10/00* (2012.01)
(Continued)

(52) U.S. Cl.
CPC ... *G06Q 10/06314* (2013.01); *G05B 23/0267* (2013.01); *G06Q 10/20* (2013.01)

(58) Field of Classification Search
CPC .... G06Q 10/06; G06Q 10/20; G06Q 10/0631; G06Q 10/06311
See application file for complete search history.

(56) References Cited

U.S. PATENT DOCUMENTS 5,095,365 A * 3/1992 Takatoo ................ G07C 3/00
348/143
5,148,363 A * 9/1992 Sakamoto ............ G05B 19/058
700/108
(Continued)

FOREIGN PATENT DOCUMENTS

JP         200538015 A    2/2005
JP        2010204801 A    9/2010
(Continued)

*Primary Examiner* — Scott L Jarrett
(74) *Attorney, Agent, or Firm* — The Webb Law Firm

(57) ABSTRACT

A device management system includes a storage unit which stores, in advance and in correlation with device identification information set in each steam controller, location information indicating a location of each steam controller. The storage unit further stores in advance work patterns for the steam controller according to a classification based on a device type and an installation state of the steam controller. The system further includes a data extraction unit configured to extract from the storage unit the location information from the device identification information based on detection information. The data extraction unit is further configured to extract a corresponding work pattern from the device type and the installation state specified from the device identification information. A work information generation unit is included for generating work information including the extracted location information and work pattern for each work-target device.

12 Claims, 3 Drawing Sheets

(51) Int. Cl.
  *G05B 23/02* (2006.01)
  *F01K 13/00* (2006.01)
  *F16T 1/48* (2006.01)

(56) References Cited

U.S. PATENT DOCUMENTS

| | | | | |
|---|---|---|---|---|
| 5,467,268 A * | 11/1995 | Sisley | ............... | G06Q 10/06 |
| | | | | 705/7.16 |
| 5,557,549 A * | 9/1996 | Chang | ............... | F25J 3/04848 |
| | | | | 700/83 |
| 6,226,563 B1 * | 5/2001 | Lim | ............... | G05B 19/4184 |
| | | | | 438/14 |
| 6,725,182 B2 * | 4/2004 | Pagnano | ............... | G05B 19/0425 |
| | | | | 340/635 |
| 7,088,255 B2 * | 8/2006 | Ridolfo | ............... | G05B 23/0272 |
| | | | | 340/506 |
| 7,110,843 B2 * | 9/2006 | Pagnano | ............... | G05B 23/0283 |
| | | | | 700/108 |
| 7,139,681 B2 * | 11/2006 | Yoshie | ............... | G05B 23/0229 |
| | | | | 702/188 |
| 7,206,771 B2 * | 4/2007 | Alvarez | ............... | G06Q 10/06 |
| | | | | 706/45 |
| 7,266,515 B2 * | 9/2007 | Costello | ............... | B61K 13/00 |
| | | | | 705/26.8 |
| 7,295,887 B2 * | 11/2007 | Matsumoto | ............... | G05B 23/0272 |
| | | | | 700/174 |
| 7,472,024 B2 * | 12/2008 | Sato | ............... | G06F 11/008 |
| | | | | 340/511 |
| 7,493,276 B2 * | 2/2009 | Adams | ............... | G01S 5/0027 |
| | | | | 705/30 |
| 7,617,073 B2 * | 11/2009 | Trinon | ............... | G06F 11/008 |
| | | | | 702/183 |
| 8,423,397 B2 * | 4/2013 | Sitton | ............... | G06Q 10/0635 |
| | | | | 705/7.28 |
| 8,509,935 B2 * | 8/2013 | Hoyte | ............... | G05B 23/0294 |
| | | | | 700/108 |
| 8,769,345 B2 * | 7/2014 | Ceglia | ............... | G05B 23/0267 |
| | | | | 714/46 |
| 9,146,556 B2 * | 9/2015 | Ito | ............... | G05B 19/4063 |
| 9,256,221 B2 * | 2/2016 | Araki | ............... | G05B 19/41875 |
| 9,477,223 B2 * | 10/2016 | Shaikh | ............... | G05B 23/0283 |
| 9,495,717 B2 * | 11/2016 | Anzai | ............... | G06Q 10/06 |
| 10,096,003 B2 * | 10/2018 | Vahid | ............... | G06Q 10/20 |
| 2001/0013832 A1 * | 8/2001 | Chavand | ............... | F17C 13/02 |
| | | | | 340/679 |
| 2003/0004656 A1 * | 1/2003 | Bjornson | ............... | G05B 23/0278 |
| | | | | 702/34 |
| 2003/0005107 A1 * | 1/2003 | Dulberg | ............... | G06F 9/54 |
| | | | | 709/223 |
| 2003/0005486 A1 * | 1/2003 | Ridolfo | ............... | G05B 23/0272 |
| | | | | 800/288 |
| 2003/0023518 A1 * | 1/2003 | Spriggs | ............... | G05B 15/02 |
| | | | | 705/28 |
| 2004/0230455 A1 * | 11/2004 | McKinney | ............... | G06Q 10/06 |
| | | | | 709/201 |
| 2005/0157327 A1 * | 7/2005 | Shoji | ............... | G06K 15/408 |
| | | | | 358/1.14 |
| 2006/0036403 A1 * | 2/2006 | Wegerich | ............... | G05B 23/0254 |
| | | | | 702/183 |
| 2006/0122808 A1 | 6/2006 | Quake et al. | | |
| 2006/0164244 A1 | 7/2006 | Kiriyama | | |
| 2007/0088528 A1 * | 4/2007 | Miller | ............... | G05B 23/024 |
| | | | | 702/185 |
| 2007/0132779 A1 * | 6/2007 | Gilbert | ............... | G06F 9/4488 |
| | | | | 345/619 |
| 2007/0156373 A1 * | 7/2007 | Yamashita | ............... | F25B 49/005 |
| | | | | 702/182 |
| 2008/0046104 A1 * | 2/2008 | Van Camp | ............... | G05B 15/02 |
| | | | | 700/90 |
| 2009/0044042 A1 | 2/2009 | Fujiwara et al. | | |
| 2009/0077055 A1 * | 3/2009 | Dillon | ............... | G06F 16/337 |
| 2009/0217101 A1 * | 8/2009 | Becker | ............... | G05B 23/0278 |
| | | | | 714/39 |
| 2009/0228121 A1 | 9/2009 | Fujiwara et al. | | |
| 2010/0100778 A1 * | 4/2010 | Sullivan | ............... | H04L 12/00 |
| | | | | 714/57 |
| 2011/0015962 A1 * | 1/2011 | Finucan | ............... | G06Q 10/20 |
| | | | | 705/305 |
| 2011/0029102 A1 * | 2/2011 | Campney | ............... | G05B 15/02 |
| | | | | 700/83 |
| 2011/0087977 A1 * | 4/2011 | Campney | ............... | G05B 19/0426 |
| | | | | 715/763 |
| 2011/0267188 A1 * | 11/2011 | Wilson | ............... | G06F 3/0605 |
| | | | | 340/521 |
| 2012/0259745 A1 * | 10/2012 | Kusada | ............... | A01K 5/02 |
| | | | | 705/28 |
| 2014/0214801 A1 * | 7/2014 | Ciliberti, III | ............... | G06Q 10/0631 |
| | | | | 707/722 |
| 2014/0222378 A1 * | 8/2014 | Piety | ............... | G05B 23/0283 |
| | | | | 702/183 |
| 2015/0160098 A1 * | 6/2015 | Noda | ............... | G05B 23/024 |
| | | | | 702/35 |
| 2015/0221077 A1 * | 8/2015 | Kawabata | ............... | G06T 7/001 |
| | | | | 382/141 |
| 2016/0132046 A1 * | 5/2016 | Beoughter | ............... | G05B 19/4184 |
| | | | | 700/17 |
| 2016/0210580 A1 * | 7/2016 | Rydland | ............... | G06Q 10/06393 |
| 2016/0239756 A1 * | 8/2016 | Aggour | ............... | G05B 23/0229 |

FOREIGN PATENT DOCUMENTS

| | | |
|---|---|---|
| JP | 2011113161 A | 6/2011 |
| JP | 20133863 A | 1/2013 |
| WO | 2007013466 A1 | 2/2007 |

* cited by examiner

SYSTEM AND METHOD FOR GENERATING DEVICE WORK ORDERS BASED ON WORK PATTERNS AND PLANT LOCATION

CROSS-REFERENCE TO RELATED APPLICATIONS

This application is the United States national phase of International Application No. PCT/JP2015/079306 filed Oct. 16, 2015, and claims priority to Japanese Patent Application No. 2014-238939 filed Nov. 26, 2014, the disclosures of which are hereby incorporated in their entirety by reference.

TECHNICAL FIELD

The present disclosure relates to a device management system including a state detection unit configured to detect a state of each steam controller in a plant of interest, an input unit configured to input detection information from the state detection unit, and a state determination unit configured to effect determination of whether a state of the target steam controller is normal or not. The disclosure relates also to a maintenance work method using such system.

BACKGROUND ART

Conventionally, management of a steam controller for controlling steam flowing in a plant (e.g. a steam trap for discharging drain such as condensate contained in steam, a valve for controlling direction or amount of steam in a steam pipe, a straightener for removing foreign matters mixed in steam, etc.) has been effected by e.g. a device management system configured to input detection information via a state detection unit for detecting a state of the steam controller and then to determine the state of the steam controller based on this detection information (see Patent Document 1).

With the above-described system, for steam controllers installed in a plant, information such as information of which steam controller is malfunctioning are collected in a data management device. Thus, with reference to the data management device, to which steam controller maintenance work such as repair, replacement or the like should be done, can be known.

PRIOR ART DOCUMENT

Patent Document

Patent Document 1: Japanese Unexamined Patent Application Publication No. 2010-204801

SUMMARY

However, even when a work-target device is determined and a maintenance work is effected thereon, as many such steam controllers are installed in distribution in the plant, difficulties would be involved in grasping the specific location of the work-target device, or specifying the location of the work-target device even when access is made successfully to the area peripherally of the work-target device, or specifying which one is the work-target device in case a plurality of steam controllers are present densely in the area.

Further, regarding the maintenance work to be effected on the steam controller, its pattern, such as whether the device is to be repaired or replaced, what tool/method to be used for the repair or replacement, or by which type of device it should be replaced, etc., will largely vary depending on the device type, the installation state of the steam controller, and the necessary tool or a steam controller for replacement too will vary depending on the work pattern. Therefore, in order to allow the work to proceed in an efficient manner, it is necessary to carry it out, with accurately grasping of such work patterns as above.

In this way, in order to effect a maintenance work on a steam controller efficiently, the location of the steam controller and the work patterns therefor need to be grasped. However, the above-described conventional system grasps only on which steam controller the work is to be effected, but failing to take the above-described factors into consideration.

In view of the state of the art described above, a principal object of the present disclosure is to provide a device management system capable of executing a maintenance work on a steam controller in an efficient manner.

A device management system, according to this disclosure, includes:

a state detection unit configured to detect a state of each steam controller in a plant of interest;

an input unit configured to input detection information from the state detection unit; and a state determination unit configured to effect determination of whether the state of a target steam controller is normal or not;

for each steam controller in the plant of interest, device identification information for identifying the each steam controller being set;

the state detection unit being configured to input the detection information including the corresponding device identification information to the input unit;

the device management system comprising:

a storage unit which stores, in advance and in correlation with the device identification information set in each steam controller, location information indicating a location of each steam controller in the plant of interest, the storage unit further storing in advance work patterns for the steam controller according to a classification based on a device type and an installation state of the steam controller;

a data extraction unit configured to extract from the storage unit the location information from the device identification information based on the detection information and to extract also a corresponding work pattern from the device type and the installation state specified from the device identification information, for a work-target device comprised of a steam controller whose state is determined as being not normal by the state determination unit; and a work information generation unit for generating work information consisting of the extracted location information and work pattern for the work-target device.

Namely, with the above-described arrangement, responsive to input of detection information from the state detection unit to the data management device, location information and a work pattern of the steam controller stored in advance in the storage unit of the data management device are extracted from the data extraction unit based on the device identification information of the work-target device based on the inputted detection information as well as the device type (device being a steam trap or a valve or device model, etc.) and the installation state (e.g. mode of connection, use, temperature and pressure conditions (temperature and pressure of steam to pass therethrough), its installation period, number of repair works made thereon so far, etc.) which can be specified from the device identification information. Then, the work information generation unit generates work information that consists of the extracted location information and the work pattern for the work-target device. And, based on this work information, the location and the work pattern of the target steam controller can be grasped clearly. Consequently, the maintenance work can be effected in an efficient manner with utilization of this work information.

Incidentally, the extraction of the location information and work pattern of the steam controller by the data extraction unit can be implemented in an automatic manner by the data extraction unit from the device identification information and the device type and installation state of the steam controller specified from the device identification information. Alternatively, the data extraction unit can effect this extraction responsive to an instruction of a human while this human makes reference to the device identification information and the device type and installation state of the steam controller specified from the device identification information. Further alternatively, the extraction can be any desired combination of such automatic extraction and manual extraction, e.g. automatic extraction of location information combined with manual extraction of the work pattern for the steam controller by a human instruction.

Further, the location information can be any such information indicating the specific location of the steam controller in the plant of interest, such as a drawing or diagram showing the location of the work-target device in the layout plan of the plant, a name of area of the plant in which the work-target device belongs, the specific installation location or a name of equipment or instrument attached thereto, etc. As examples of the work patterns for the steam controller, there can be cited a type of maintenance work, an item to be improved, a necessary tool, an image showing a target work place of the steam controller or its periphery, etc.

Next, some preferred embodiments of the device management system relating to this disclosure will be explained. It is understood however that the scope of the present disclosure is not to be limited in anyway by these preferred modes of embodiment to be described next.

According to one preferred mode of embodiment:
the state determination unit is configured to effect also determination of a type of malfunction of the target steam controller;
the storage unit is configured to store the work patterns according to a classification of type of malfunction, and the device type and installation state of the steam controller; and
the data extraction unit is configured to extract the work pattern, based on the malfunction type and the device type and installation state of the steam controller specified from the device identification information.

Namely, with the above-described arrangement, the work patterns can be classified in more detailed manner as being based not only on the device type of the steam controller and the installation state of the steam controller, but also on the malfunction type, whereby a work pattern further suited to the work-target device can be extracted from the data extraction unit. So, the maintenance work can be carried out in even more efficient manner, based on the work information generated as above.

According to a preferred mode of embodiment, the location information includes an image indicating a location of the steam controller corresponding to the device identification information in a layout plan of the plant and a photographic image of the steam controller.

Namely, with the above-described arrangement, from the image indicating the location in the plant layout plan included in the location information, it can be known clearly where to go to carry out the maintenance work on the work-target device. Further, from the photographic image of the steam controller, the work-target device can be readily identified. Thus, traveling to the location of the work-target device and its identification can be carried out easily. Whereby, the maintenance work can be carried out in an even more efficient manner.

According to a preferred mode of embodiment:
the state determination unit is configured to determine also a degree of malfunction of the target steam controller; and
the data extraction unit is configured further to effect selection of the steam controller as the work-target device, for which the extraction of the location information and the work pattern are to be effected, based on the degree of malfunction determined by the state determination unit, from among steam controller(s) determined as being malfunctioning.

Namely, with the above-described arrangement, the work information needed for the maintenance work can be generated only for one or more steam controllers that requiring the work expeditiously, with exclusion of the steam controllers indicating such low degree of malfunction that does not necessitate the maintenance work absolutely. With this, the maintenance work can be carried out efficiently for only those steam controllers that require the maintenance work.

According to one preferred mode of embodiment, the work information generation unit is configured to generate a work execution order schedule that recommends an execution order of work-target devices to be worked on, based on the location information of the respective work-target devices.

Namely, with the above-described arrangement, with generation of the work execution order schedule, it can be known in what order the works should be effected on the work-target devices in order to allow the works to proceed efficiently. With this, the maintenance work can be effected in an even more efficient manner.

According to one preferred mode of embodiment, the work information generation unit is configured to calculate the work execution order, based on a total traveling distance or a total traveling time of the work for the respective work-target devices calculated from the location information.

Namely, with the above-described arrangement, an efficient work execution order schedule can be generated, from the viewpoint of total traveling distance or total traveling time.

According to one preferred mode of embodiment, the work information generation unit is configured to generate the work execution order, with additionally taking into consideration the work type based on the work pattern corresponding to the respective work-target device.

Namely, with the above-described arrangement, for instance, it is possible to generate a work execution order schedule that copes with a case of devices requiring only repair should be worked on with priority, thus eliminating need to bring any replacement device to the site of work or a case where those devices requiring a same type of work type (repair or device replacement, or which type of device repair/replacement is to be effected, etc.) are to be worked on with priority for the sake of efficiency, e.g. a case of devices of type on which a special method or tool is to be used for the repair/replacement work should be worked on with priority.

According to one preferred mode of embodiment, the work information generation unit is configured to generate, as the work execution order schedule, a work execution order schedule in which the work information of the work-target devices are listed based on the recommended work execution order.

Namely, with the above-described arrangement, as the work execution order schedule, the work information of the work-target devices to be worked on will be shown according to the recommended work execution order. So, by carrying out the works according to this work execution order schedule, the works can be effected in an extremely efficient manner.

A maintenance work method, according to this disclosure, using the device management system relating to the disclosure described above, the method comprises:

carrying a mobile displaying body displaying one or both of the work information and the work execution order schedule of the respective work-target devices; and executing a work on the respective work-target device with reference to one or both of the work information and the work execution order schedule.

Namely, with the above-described arrangement, since the work is effected based on one or both of the work information showing information required for executing the maintenance work efficiently and the work execution order schedule showing efficient work execution order, the works can be carried out efficiently.

Incidentally, the displaying body can be any appropriate displaying body such as a mobile terminal having a display device or can be also in the form of a sheet of paper on which the work information and/or the work execution order schedule are/is printed, etc.

Next, preferred modes of embodiment of the maintenance work method according to this disclosure will be described. It is understood however that the scope of this disclosure is not to be limited in any way by the following.

According to one preferred mode of embodiment, the method further comprises installing a mark for the respective work-target device, prior to execution of the work.

Namely, with the above-described arrangement, the work-target device can be clearly and easily identified by the mark. So, the maintenance work can be effected in even more efficient manner. Incidentally, the mark is not particularly limited as long as it can identify the work-target device.

According to one preferred mode of embodiment, the mark comprises a printed matter of the work information corresponding to the work-target device for which the mark is installed.

Namely, with the above-described arrangement, by providing the mark in the form of a printed matter of the work information corresponding to the work-target device, the corresponding work-target device can be easily identified with reference to such mark. So, the mark can be installed for each work-target device in an efficient manner.

EMBODIMENTS

Figure 1:
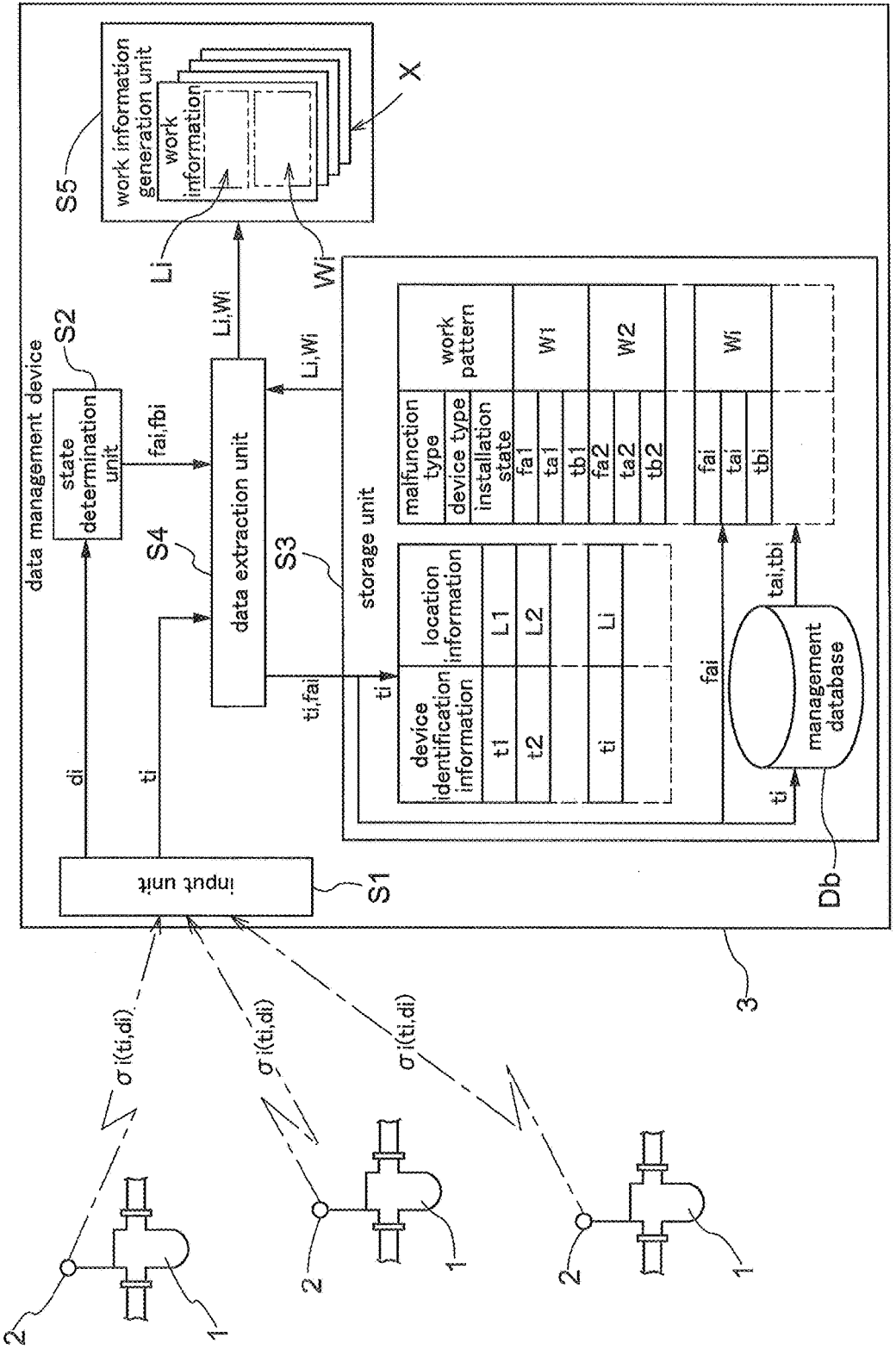
FIG. 1 is a schematic configuration diagram of a device management system.

FIG. 1 is a schematic of the present disclosure. A device management system relating to this disclosure includes a state detector (a 'state detection unit') 2 for detecting a state of each steam controller 1 in a plant of interest, and a data management device 3 for inputting detection information from the state detector 2 and executing management of the detection information. Here, the language "steam controller" refers to such devices in general exemplified by a steam trap, a valve, provided for controlling steam that is to flow in the plant.

In the plant, many steam controllers 1 are installed in distribution. Each steam controller 1 is provided with the state detector 2 configured to detect temperature and vibration of this steam controller 1. Further, in each steam controller 1, device identification information (e.g. a management ID, etc.) (ti) for identifying each steam controller 1 is set. The state detector 2 periodically transmits detection values (d1) of temperature and vibration and device identification information (ti) of this installed steam controller 1 as detection information (σi) to a data management device 3 via an unillustrated communication device.

The data management device 3 consists mainly of: an input unit S1 to which the detection information (σi) is inputted; a state determination unit S2 for executing state determination of the steam controller 1 based on the detection values (d1); a storage unit S3 for storing various kinds of data; a data extraction unit S4 for extracting location information (Li) and work pattern (Wi) from the storage unit S3; and a work information generation unit S5 for generating work information (X) from the location information (Li) and the work pattern (Wi) extracted from the data extraction unit S4.

For the target steam controller 1, the state determination unit S2 effects, based on the detection values (d1) inputted thereto, determination of whether the state thereof is normal or not, determination of a malfunction type (e.g. steam leak, clogging abnormality, or temperature abnormality, in the case of a steam trap) (fai) and also determination of a malfunction degree (light malfunction, medium malfunction, or severe malfunction) (fbi). These determinations are effected by comparing a respective set threshold value with the detected value (di).

For instance, the determination of whether the state is normal or not is effected by determining whether the detected value (di) exceeds the threshold value or not.

The determination of the malfunction type (fai) can be effected by e.g. determining which physical amount of the detection value (di) exceeds or falls short of a set threshold value. For instance, respecting a steam trap, if the detection value (di) of vibration exceeds a set threshold, it is determined that the malfunction type (fai) thereof is steam leak. Whereas, if the detection value (di) of temperature falls short of a set threshold, it is determined that the malfunction type (fai) thereof is clogging abnormality. Further, respecting temperature abnormality, for the detection value (di) of temperature, a different threshold value from the case of clogging abnormality is set, and if the detection value (di) of temperature exceeds or falls short of an appropriate range, it is determined that the malfunction type (fai) is temperature abnormality.

The determination of malfunction degree (fbi) can be made by setting a plurality of stages of threshold value and checking which stage of threshold value the detection value (di) exceeds or falls short of.

Further, in the determination of the detection value (di) and the threshold value, though not shown, the storage unit S3 to be described later stores therein threshold values corresponding to various device types and installation states, respectively, based on the device types of the steam controller 1 (product model etc.) and installation states of the steam controller 1 (temperature/pressure conditions, etc.).

As the state determination unit S2 receives input of device identification information (ti) in addition to the detection values (di), the unit S2 automatically extracts corresponding threshold values from the storage unit S3 based on a device type and an installation state that are specified from this device identification information (ti) and then effects determination based on the detection values (di) and the threshold values.

The storage unit S3 stores a management database (Db) that records information relating to the respective steam controllers 1 such as basic information, e.g. the device types and installation states of the steam controllers 1 and determination results obtained in the state determination unit S2, etc. in correlation with the device identification information (ti). Determination result at the state determination unit S2 is generated periodically based on the detection information (di) transmitted thereto periodically. Thus generated determination results will be recorded cumulatively in the management database (Db). The management database (Db) further records and stores therein a plant layout plan image (P) showing identifiers at locations corresponding to the respective steam controllers 1 in the plant on the plant layout plan, such as one shown in FIG. 3. The management database (Db) further records and stores therein threshold values based on the device types and installation states of the steam controllers 1 described above.

Moreover, the storage unit S3 stores in advance therein location information (Li) indicating locations of the respective steam controllers 1 in the plant of interest, in correlation with the device identification information (ti). Further, the storage unit S3 stores in advance therein work patterns (Wi) for the steam controllers 1 according to a classification based on the malfunction types (fai) and the device types (tai) of the steam controllers 1 (the device types such as a steam trap, a valve, etc. or its model type) and the installation states (tbi) of the steam controllers 1 (e.g. mode of connection, usage, temperature/pressure condition (steam of what temperature/pressure flows therethrough), installment period, number of repair works effected so far, etc.).

Figure 2:
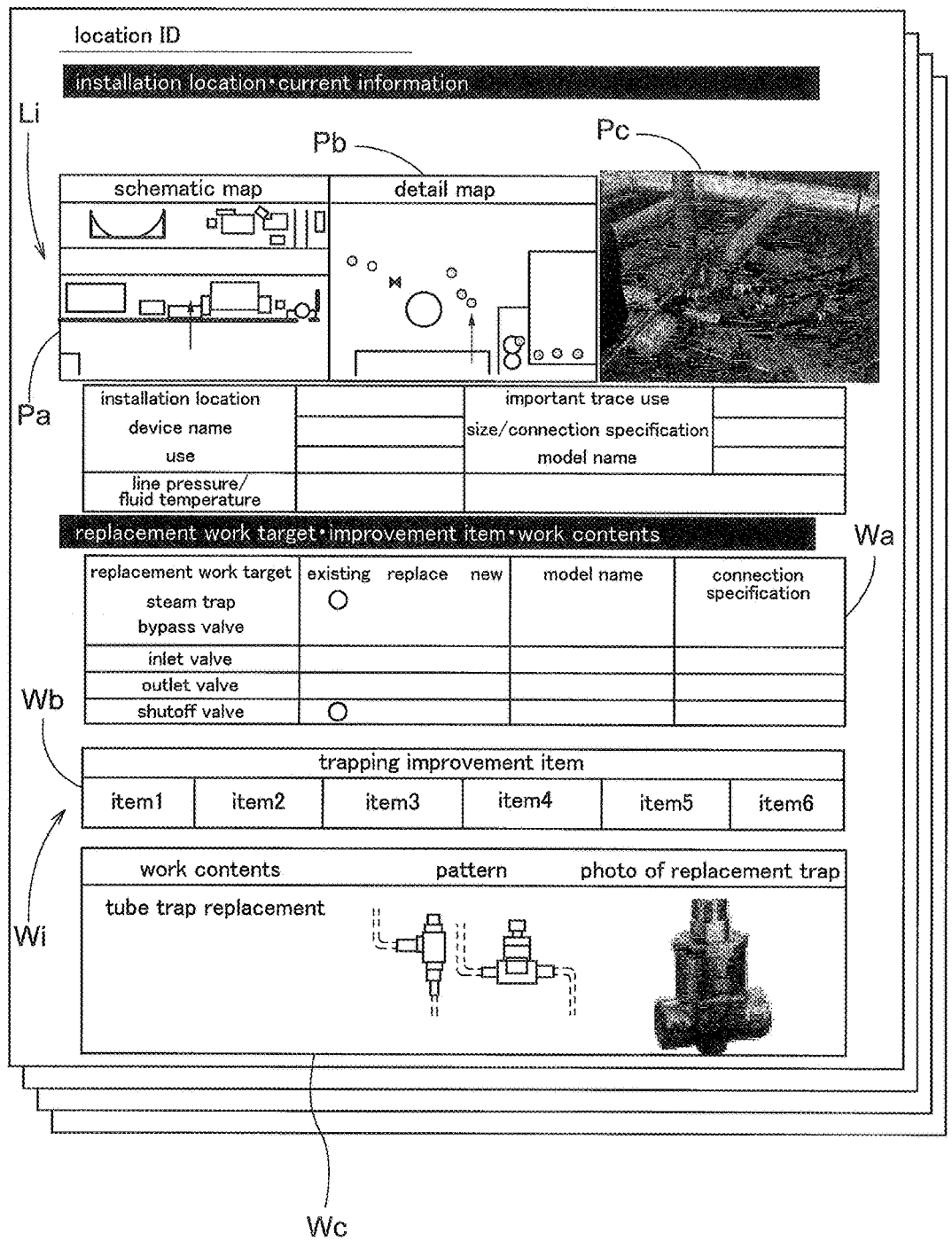
FIG. 2 is a view showing work information.
Figure 3:
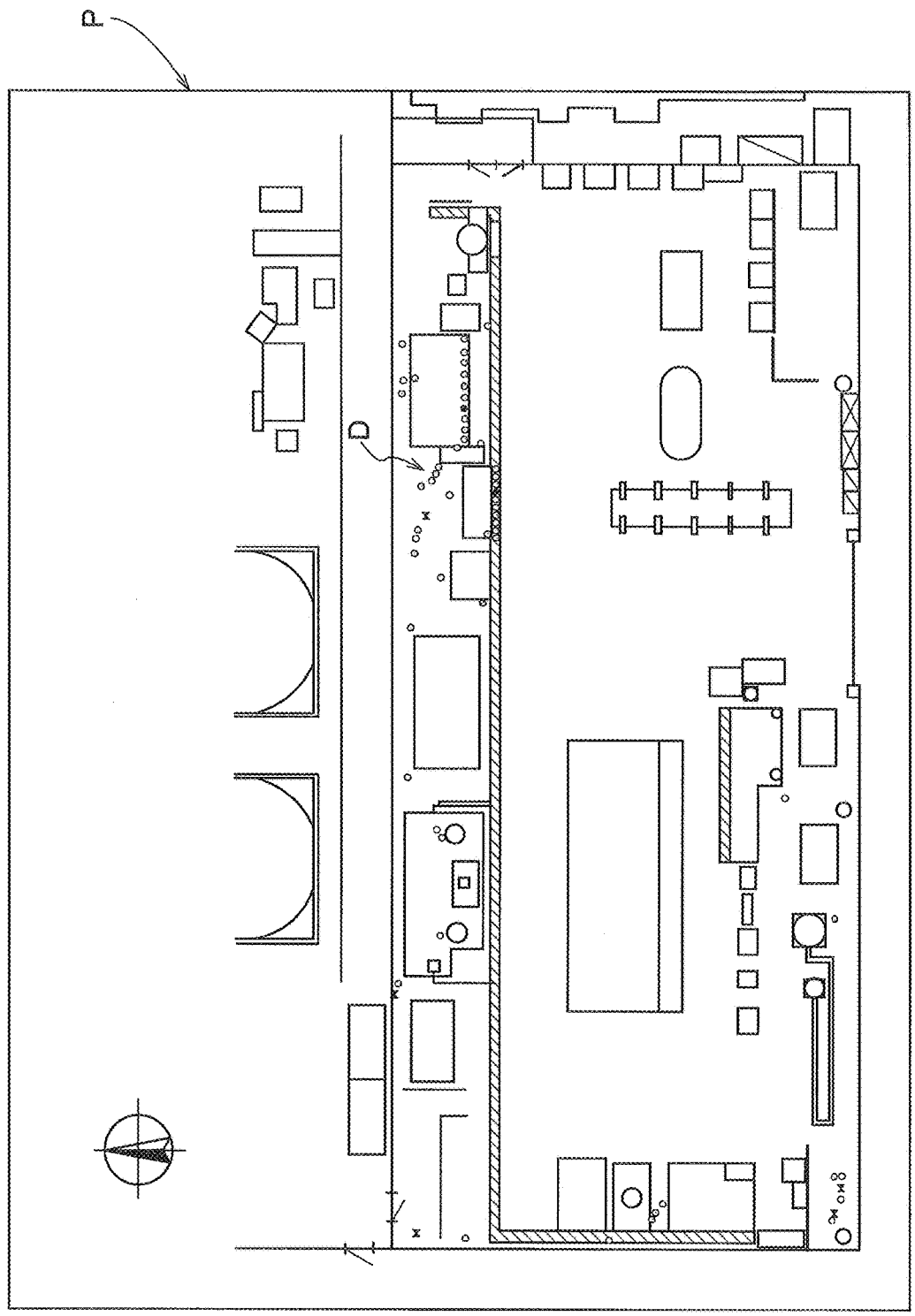
FIG. 3 is a view showing plant layout plan image.

The location information (Li), as shown in FIG. 3, comprises coordinate values of the target steam controller 1 in the plant on the plant layout plan, in the plant layout plan image (P) in which identifiers (D) are provided at positions corresponding to the respective steam controllers 1, a photographic image Pc (see FIG. 2) for specifying the target steam controller and basic information (installation location, name, use, temperature and pressure conditions, size, connection mode, model type of the target steam controller to be worked on) of the target steam controller.

The work patterns (Wi) comprise e.g. items to be improved, types of work (repair or replacement; repair or replacement of peripheral portion such as pipe or not), necessary tool, image showing the site of work, such as a steam controller or its periphery, etc. an image of device for replacement, and so on.

The data extraction unit S4 selects a steam controller 1 determined as malfunctioning by the state determination unit S2 as a work-target device and then automatically extracts the corresponding location information (Li) from the storage unit S3 based on the device identification information (ti) for each such work-target device. Simultaneously, the data extraction unit S4 specifies corresponding device type (tai) and installation state (tbi) from the management database (Db) of the storage unit S3, based on the device identification information (ti) and automatically extracts a corresponding work pattern (Wi) from the storage unit S3, based on the malfunction type (fai), the device type (tai) and the installation state (tbi).

Incidentally, the data extraction unit S4 may implement the selection of work-target device, with additionally taking into consideration, the malfunction degree (fbi). For instance, of those steam controllers 1 whose states have been determined as malfunctioning by the state determination unit S2, only one or more whose malfunction degree (fbi) is determined higher than the medium degree of malfunction can be selected as a work-target device(s) to be worked on, whereas the others whose malfunction degree (fbi) is light degree, can be left intact without being selected as the work-target device(s) to be worked on.

The work information generation unit S5 generates work information (X) from the location information (Li) and the work pattern (Wi) extracted by the data extraction unit S4. The work information (X) can be any 'compilation' of location information (Li) and work pattern (Wi). As a non-limiting example of work information (X), a work instruction sheet such as one shown in FIG. 2 can be produced.

As shown in FIG. 2, the work instruction sheet shows, in its upper section, images (Pa, Pb) indicating the location of the work-target device in the layout plan of the plant and a photographic image (Pc) of the work-target device, as the location information (Li).

The images (Pa, Pb) show the plant layout plan image (P) in reduced scales. Specifically, based on coordinate values of the steam controller 1 of interest in the plant layout plan image (P), the images (Pa, Pb) show the plant layout plan image (P) in a respective predetermined scale, relative to an identifier (D) corresponding to the work-target device (incidentally, in the illustration of FIG. 2, for the convenience of size of the sheet plane, the identifier (D) is omitted from the image (Pa) in FIG. 2). The image (Pa) has a reduced scale for enabling understanding of the location of the work-target device in the whole plant. The image (Pb) is shown as an image in a larger scale than the image (Pa) for better understanding of its position in details. Further, in both of these images, the identifier is denoted by an arrow so as to allow recognition of which is the work-target device.

With these images (Pa-Pc), firstly, with reference to the image (Pa), it can be known to which place approximately in the plant one should travel. And, with reference to the image (Pb), its particular location can be specified. Lastly, with reference to the image (Pc), it is possible to recognize which device present in the periphery of the location shown in the image (Pb) is the work-target device at issue. In this way, with references to the images (Pa-Pc) one after another, traveling to the work-target device and its identification can be effected in an easy and efficient manner.

Further, under the images (Pa-Pc), there are shown, as the basic information of the work-target device, the installation location, name, usage, temperature-pressure conditions, size, connection mode, device model type are displayed.

In the lower section, as the work patterns (Wi), there are displayed a field (Wa) displaying information relating to the work-target device in the form of an expression formula, a field (Wb) displaying an item(s) to be improved, a field (Wc) displaying specific contents of the work. In the field (Wa), for each device type of steam controller, its model, specifications, connection mode, etc. are shown and in the respective row corresponding to the work-target device, information such as its model type, is displayed (FIG. 2 shows an example of the work-target device being a steam controller, so relevant information is shown in the frame of the field (Wa) to which the steam controller corresponds). In the field (Wb), preset items for improvement are listed and selected item(s) for improvement is/are displayed with emphasis, based on the malfunction type (fai), the device type (tai) and the installation state (tbi) of the work-target device. In the field (Wc), the type of work (repair or replacement, or repair/replacement of its peripheral portion such as a pipe), its method, an image indicating the location to be worked, an image of device for replacement to be newly installed in the case of replacement.

With using such work patterns (Wi) above, with reference to the field (Wa), items of the basic information of the work-target device can be obtained altogether; with reference to the field (Wb), it can be known what should be improved in the work-target device; and with reference to the field (Wc), it can be known what specifically should be done as the work and also what type of device should be prepared in the case of replacement. In this way, with reference to the work patterns (Wi), it is readily possible to recognize what should be done as the maintenance work, so that the maintenance work can be effected in an efficient manner.

Further, the work information generation unit S5 is configured to calculate, based on the location information (Li) of each work-target device, a recommended work execution order as an order according to which the work should be carried out for the respective work-target devices. More particularly, the work execution order will be determined, based on a total traveling distance and a total traveling time if works are to be effected on all of the work-target devices. For instance, based on the coordinate values of the position of the identifier for each work-target device in the plant layout plan image (P), the total traveling distance or the total traveling time will be calculated for works when these works are effected on all the work-target devices according to a chosen work execution order. And, a work execution order which is found most advantageous in terms of thus calculated total traveling distance or total traveling time will be determined as a 'recommended work execution order'.

Incidentally, the work information generation unit S5 may alternatively generate the work execution order, with taking into consideration also the work type based on the work pattern (Wi) corresponding to the respective work-target device. For instance, the work execution order may be generated such that a work-target device of a particular work type should be worked on with priority for the sake of higher efficiency, such as in the case where the devices on which only repair should be effected should be worked on with priority, so as to eliminate need for making a replacement device ready or available, or in the case where only the device type on which a special method or tool is used for its repair or replacement should be worked on with priority for the sake of higher efficiency.

Furthermore, the work information generation unit S5 generates, as a work execution order schedule, document data listing the work information (X) of the respective work-target devices based on a calculated recommended work execution order. With this, simply by executing a work with reference to the work information (X) shown in this work execution order schedule, the work can be effected in an efficient manner. Optionally, as a work execution order schedule, a work execution order schedule showing only a recommended work execution order to the respective work-target devices can be produced.

The data management device 3, with its configuration described above, effects selection of work-target device(s) based on the detection information (σi) periodically transmitted from the state detectors 2 and also produces the work information (X) and a work execution order schedule of the work for the selected work-target devices.

Next, a method of maintenance work of steam controllers using the above-described device management system will be explained.

Firstly, the data management device 3 selects a device(s) to be worked on and produces the work information (X) or work execution order schedule of the work for the selected work-target device(s). Then, firstly, prior to execution of the work, for the work information (X) of each work-target device, a printed matter is produced. Then, with reference to the location information (Li) printed on this printed matter, traveling is made to the work-target device in the plant and the printed matter of the work information (X) is set on the corresponding work-target device. With this, the printed matter becomes a 'mark', which facilitates specification of the device to the worked on, so that the maintenance work can proceed in an efficient manner.

After such printed matters of the work information (X) are set to all the work-target devices, as a preparation for the work to be executed, based on the work information (X) of the respective work-target device, a tool required for execution of the maintenance work or a replacement steam controller 1 therefor will be made ready.

After completion of the preparation of the work, the process moves on to execution of the work. In this work execution, with using the printed matter as a 'displaying unit', as the work execution order schedule, based on the recommended work execution order, the document data listing therein the work information (X) of the work-target device will be printed on a print sheet and then with reference to this printed matter, a worker will travel to each work-target device with carrying with him/her a tool or replacement steam controller 1 shown in the work information (X) and will then execute the work shown in the work information (X) on the respective work-target device. Optionally, as the displaying unit above, a mobile terminal device having a display can be used also. In such case, an arrangement may be made such that the work information (X) or the work execution order schedule is obtained by wired or wireless communication from the data management device 3 and such work information (X) or work execution order schedule is shown on its display.

In this way, by executing a work on a steam controller with using the device management system relating to this disclosure, the maintenance work can be effected based on the work information showing information necessary for executing the work efficiently and the work execution order schedule showing efficient work execution order, the maintenance work can be carried out in an efficient manner.

Other Embodiments

Next, other embodiments will be described respectively. It is understood that the following modes of embodiment can be implemented individually or in any desired combination.

In the foregoing embodiment, there was shown the arrangement in which the state detectors 2 are provided to the respective steam controllers 1. However, the disclosure is not limited thereto, and a mobile type detector can be used as the state detector 2, so that a person in charge will carry this mobile state detector 2 with him/her and effect detection of the steam controllers 1 one after another. In this case, at the time of detection of the steam controller 1 by the mobile state detector 2, a photograph image (Pc) of the steam controller 1 can be obtained by a camera additionally, so that in addition to the input of the detection information (σi) from the state detector 2 to the data management device 3, the photographic image (Pc) may be inputted from the camera to the data management device 3, so that as the location information (Li), the photographic image (Pc) can be stored in the data management device 3 in correlation with the device identification information (ti).

In the foregoing embodiment, there was shown an arrangement in which based on the detection values (di) as the detection information (σi) inputted from the state detector 2, the state determination unit S2 of the data management device 3 effects determination of the state of the steam controller 1. However, the present disclosure is not limited thereto. Alternatively, the state determination unit S2 may be incorporated within the state detector 2, so that this state detector 2 effects the determination of the state of the corresponding steam controller 1 and result of this determination may be included in the detection information (σi) to be inputted together to the data management device 3.

In the foregoing embodiment, there was shown an arrangement in which the data extraction unit S4 automatically extracts the work pattern (Wi). However, the present disclosure is not limited thereto. Alternatively, the malfunction type (fai), the device type (tai) and the installation state (tbi) may be displayed on an appropriate displaying unit and a classification table of the work patterns (Wi) too may be displayed on the same also. Then, a person in charge will give an instruction of a desired work pattern (Wi) from the malfunction type (fai), the device type (tai) and the installation state (tbi) as being displayed. Then, according to this instruction, the data extraction unit S4 may extract a work pattern (Wi) from the database (Db).

In the foregoing embodiment, there was shown an arrangement in which a maintenance work is effected with reference to a work execution order schedule listing the work information (X) for the respective work-target device based on a recommended work execution order. However, the present disclosure is not limited thereto. Alternatively, with using a work execution order schedule showing the recommended work execution order for the respective work-target device, the work may be effected with reference not only to the work information (X), but also to the work execution order schedule.

In the foregoing embodiment, there was shown an arrangement in which the work information generation unit S5 calculates a recommended work execution order as an order recommended for the respective work-target devices, and produces a work execution order schedule based on this work execution order. Alternatively, the work information generation unit S5 may not calculate a work execution order or effect production of a work execution order schedule.

INDUSTRIAL APPLICABILITY

The device management system of this disclosure can be applied to management of steam controllers installed in various plants or factories in various industrial fields.

DESCRIPTION OF REFERENCE MARKS/NUMERALS

1: steam controller
2: state detector (state detection unit)
S1: input unit
S2: state determination unit
S3: storage unit
S4: data extraction unit
S5: work information generation unit
σi: detection information
ti: device identification information
tai: device type
tbi: installation state
fai: malfunction type
fbi: malfunction degree
Li: location information
Pa, Pb: layout plan image
Pc: photographic image
Wi: work pattern
X: work information

The invention claimed is:

1. A device management system including:
a state detection unit configured to be connected to each steam controller in a plant of interest, wherein the each steam controller includes one of a steam trap, a valve, and a straightener, and wherein, when the state detection unit is connected to the one of the steam trap, the valve, and the straightener of the each steam controller, the state detection unit detects a state of the each steam controller including a temperature and a vibration of the each steam controller;
an input unit configured to input detection information from the state detection unit, wherein the detection information includes the temperature and the vibration of the each steam controller; and
a state determination unit configured to effect determination of whether the state of a target steam controller is normal or not;
for each steam controller in the plant of interest, device identification information for identifying the each steam controller being set in the each steam controller;
the state detection unit being configured to input the detection information including the corresponding device identification information to the input unit;
wherein the device management system comprises:
a storage unit which stores, in advance and in correlation with the device identification information set in each steam controller, location information indicating a location of each steam controller in the plant of interest, the storage unit further storing in advance work patterns for repair or replacement of the steam controller according to a classification based on a device type and an installation state of the steam controller;
a data extraction unit configured to extract from the storage unit the location information from the device identification information based on the detection information and to extract also a corresponding work pattern from the device type and the installation state specified from the device identification information, for a work-target device comprised of a steam controller whose state is determined as being not normal by the state determination unit;
a work information generation unit for generating work information including the extracted location information and work pattern for the work-target device; and
a mobile displaying body configured to display the work information of the respective work-target devices when executing a work including a repair or a replacement of the respective work-target device with reference to the work information,
wherein the state determination unit is configured to determine a degree of malfunction of the target steam controller, and
wherein the data extraction unit is configured further to effect selection of the steam controller as the work-target device, for which the extraction of the location information and the work pattern for repair or replacement are to be effected, based on the degree of malfunction determined by the state determination unit, from among one or more steam controllers determined as being malfunctioning.

2. The device management system of claim 1, wherein:
the state determination unit is configured to effect also determination of a type of malfunction of the target steam controller;
the storage unit is configured to store the work patterns according to a classification of type of malfunction, and the device type and installation state of the steam controller; and
the data extraction unit is configured to extract the work pattern, based on the malfunction type and the device type and installation state of the steam controller specified from the device identification information.

3. The device management system of claim 1, wherein the location information includes an image indicating a location of the steam controller corresponding to the device identification information in a layout plan of the plant and a photographic image of the steam controller.

4. The device management system of claim 1, wherein the work information generation unit is configured to generate a work execution order schedule that recommends an execution order of work-target devices to be worked on, based on the location information of the respective work-target devices.

5. The device management system of claim 4, wherein the work information generation unit is configured to calculate the work execution order, based on a total traveling distance or a total traveling time of the work for the respective work-target devices calculated from the location information.

6. The device management system of claim 4, wherein the work information generation unit is configured to generate the work execution order, with taking into consideration the work type based on the work pattern corresponding to the respective work-target device.

7. The device management system of claim 4, wherein the work information generation unit is configured to generate, as the work execution order schedule, a work execution order schedule in which the work information of the work-target devices are listed based on the recommended work execution order.

8. A maintenance work method, comprising:
detecting, with a state detection unit configured to be connected to each steam controller in a plant of interest, the each steam controller including one of a steam trap, a valve, and a straightener, and, when the state detection unit is connected to the one of the steam trap, the valve, and the straightener of the each steam controller, a state of the each steam controller including a temperature and a vibration of the each steam controller;
inputting, with an input unit, detection information from the state detection unit, wherein the detection information includes the temperature and the vibration of the each steam controller;
determining, with a state determination unit, whether the state of a target steam controller is normal or not, wherein, for each steam controller in the plant of interest, device identification information for identifying the each steam controller is set in the each steam controller;
inputting, with the state detection unit, the detection information including the corresponding device identification information to the input unit;
storing, with a storage unit in advance and in correlation with the device identification information set in each steam controller, location information indicating a location of each steam controller in the plant of interest, the storage unit further storing in advance work patterns for repair or replacement of the steam controller according to a classification based on a device type and an installation state of the steam controller;
extracting, with a data extraction unit from the storage unit, the location information from the device identification information based on the detection information;
extracting, with the data extraction unit, a corresponding work pattern from the device type and the installation state specified from the device identification information, for a work-target device comprised of a steam controller whose state is determined as being not normal by the state determination unit;
generating, with a work information generation unit, work information including the extracted location information and work pattern for the work-target device;
displaying, with a mobile displaying body, the work information of the respective work-target devices when executing a work including a repair or a replacement of the respective work-target device with reference to the work information;
determining, with the state determination unit, a degree of malfunction of the target steam controller;
selecting, with the data extraction unit, the steam controller as the work-target device, for which the extraction of the location information and the work pattern for repair or replacement are to be effected, based on the degree of malfunction determined by the state determination unit, from among one or more steam controllers determined as being malfunctioning;
carrying the mobile displaying body displaying the work information of the respective work-target devices; and
executing the work on the respective work-target device with reference to the work information.

9. The maintenance work method of claim 8, further comprising:
generating, with the work information generation unit, a work execution order schedule that recommends an execution order of work-target devices to be worked on, based on the location information of the respective work-target devices;
carrying the mobile displaying body displaying the work information and the work execution order schedule of the respective work-target devices; and
executing the work on the respective work-target device with reference to both of the work information and the work execution order schedule.

10. A maintenance work method, comprising:
detecting, with a state detection unit configured to be connected to each steam controller in a plant of interest, the each steam controller including one of a steam trap, a valve, and a straightener, and, when the state detection unit is connected to the one of the steam trap, the valve, and the straightener of the each steam controller, a state of the each steam controller including a temperature and a vibration of the each steam controller;

inputting, with an input unit, detection information from the state detection unit, wherein the detection information includes the temperature and the vibration of the each steam controller;

determining, with a state determination unit, whether the state of a target steam controller is normal or not, wherein, for each steam controller in the plant of interest, device identification information for identifying the each steam controller is set in the each steam controller;

inputting, with the state detection unit, the detection information including the corresponding device identification information to the input unit;

storing, with a storage unit in advance and in correlation with the device identification information set in each steam controller, location information indicating a location of each steam controller in the plant of interest, the storage unit further storing in advance work patterns for repair or replacement of the steam controller according to a classification based on a device type and an installation state of the steam controller;

extracting, with a data extraction unit from the storage unit, the location information from the device identification information based on the detection information;

extracting, with the data extraction unit, a corresponding work pattern from the device type and the installation state specified from the device identification information, for a work-target device comprised of a steam controller whose state is determined as being not normal by the state determination unit;

generating, with a work information generation unit, work information including the extracted location information and work pattern for the work-target device;

displaying, with a mobile displaying body, the work information of the respective work-target devices when executing a work including a repair or a replacement of the respective work-target device with reference to the work information;

determining, with the state determination unit, a degree of malfunction of the target steam controller;

selecting, with the data extraction unit, the steam controller as the work-target device, for which the extraction of the location information and the work pattern for repair or replacement are to be effected, based on the degree of malfunction determined by the state determination unit, from among one or more steam controllers determined as being malfunctioning;

generating, with the work information generation unit, a work execution order schedule that recommends an execution order of work-target devices to be worked on, based on the location information of the respective work-target devices, wherein the work information generation unit generates, as the work execution order schedule, a work execution order schedule in which the work information of the work-target devices are listed based on the recommended work execution order;

carrying the mobile displaying body displaying the work execution order schedule of the respective work-target devices; and executing the work on the respective work-target device with reference to the work execution order schedule.

11. The maintenance work method of claim 8, further comprising:

installing a mark for the respective work-target device, prior to the execution of the work.

12. The maintenance work method of claim 11, wherein the mark comprises a printed matter of the work information corresponding to the work-target device for which the mark is installed.

\* \* \* \* \*